United States Patent
Mui et al.

(10) Patent No.: US 6,362,870 B2
(45) Date of Patent: *Mar. 26, 2002

(54) IMAGE COPIER HAVING ENHANCED DUPLEX CAPABILITIES; METHOD OF PRINTING A COPY OF A DOCUMENT TO PRODUCE A DUPLEX COPY PRODUCT

(75) Inventors: Paul K. Mui; Russell A. Mendenhall; Craig L. Miller; Chris R. Gunning, all of Boise; J. Sean Fresk, Eagle, all of ID (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,707

(22) Filed: Oct. 26, 1998

(51) Int. Cl.[7] ........................ G03B 27/32; G03G 15/00; G03G 15/04
(52) U.S. Cl. .................. 355/24; 399/364; 399/368; 399/204; 399/82
(58) Field of Search ............................. 355/23, 24, 40; 399/363, 364, 374, 309, 152, 368, 204, 82; 358/296; 430/126; 400/104

(56) References Cited

U.S. PATENT DOCUMENTS

| | | | | |
|---|---|---|---|---|
| 4,095,979 A | * | 6/1978 | DiFrancesco et al. | 430/126 |
| 5,107,339 A | | 4/1992 | Bertoni et al. | 358/296 |
| 5,241,397 A | * | 8/1993 | Yamada | 358/296 |
| 5,598,271 A | * | 1/1997 | Ohtani | 358/296 |
| 5,703,693 A | * | 12/1997 | Morikawa | 358/296 |
| 5,730,533 A | * | 3/1998 | Noy et al. | 400/104 |
| 5,818,602 A | * | 10/1998 | Nakajima et al. | 358/296 |

OTHER PUBLICATIONS

Canon, NP Copiers: NP 6551; http://www.usa.canon.com/corpoffice/copiers/np6551.html, Feb. 2001.*

* cited by examiner

*Primary Examiner*—Russell Adams
*Assistant Examiner*—Rodney Fuller

(57) ABSTRACT

A method and apparatus for duplex copying providing enhanced time to first copy is disclosed. The apparatus includes a scanner, a printer having a duplexer, and an information pipeline configured to process a data stream representing the image of page sides of the original document to be printed onto a single page of the copy product. The copier includes a processor, a computer readable memory, and a print element. The processor is configured to deliver the first two page sides of the original document to the printer for printing prior to the scanning of all subsequent pages of the original document.

20 Claims, 8 Drawing Sheets

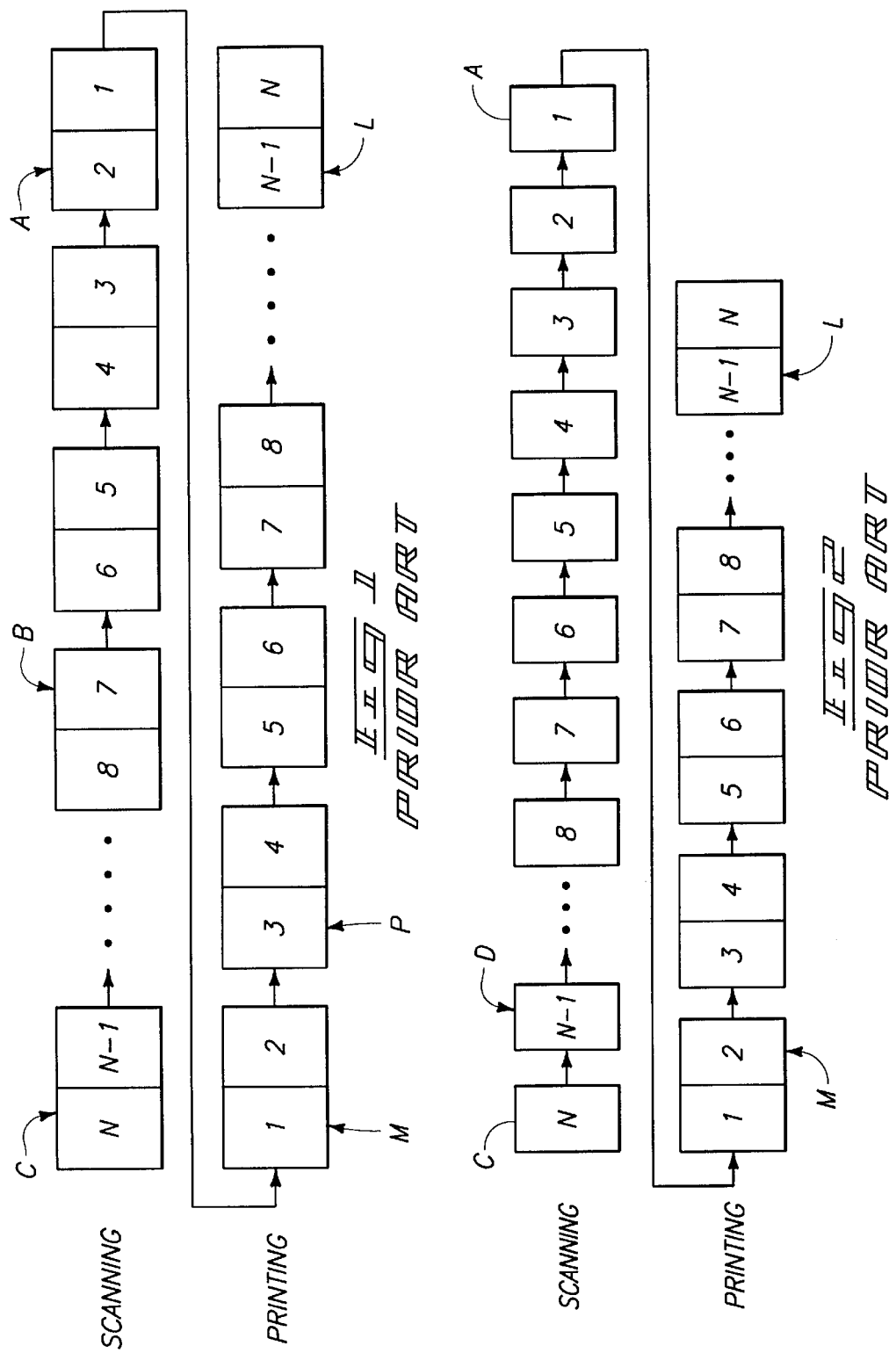

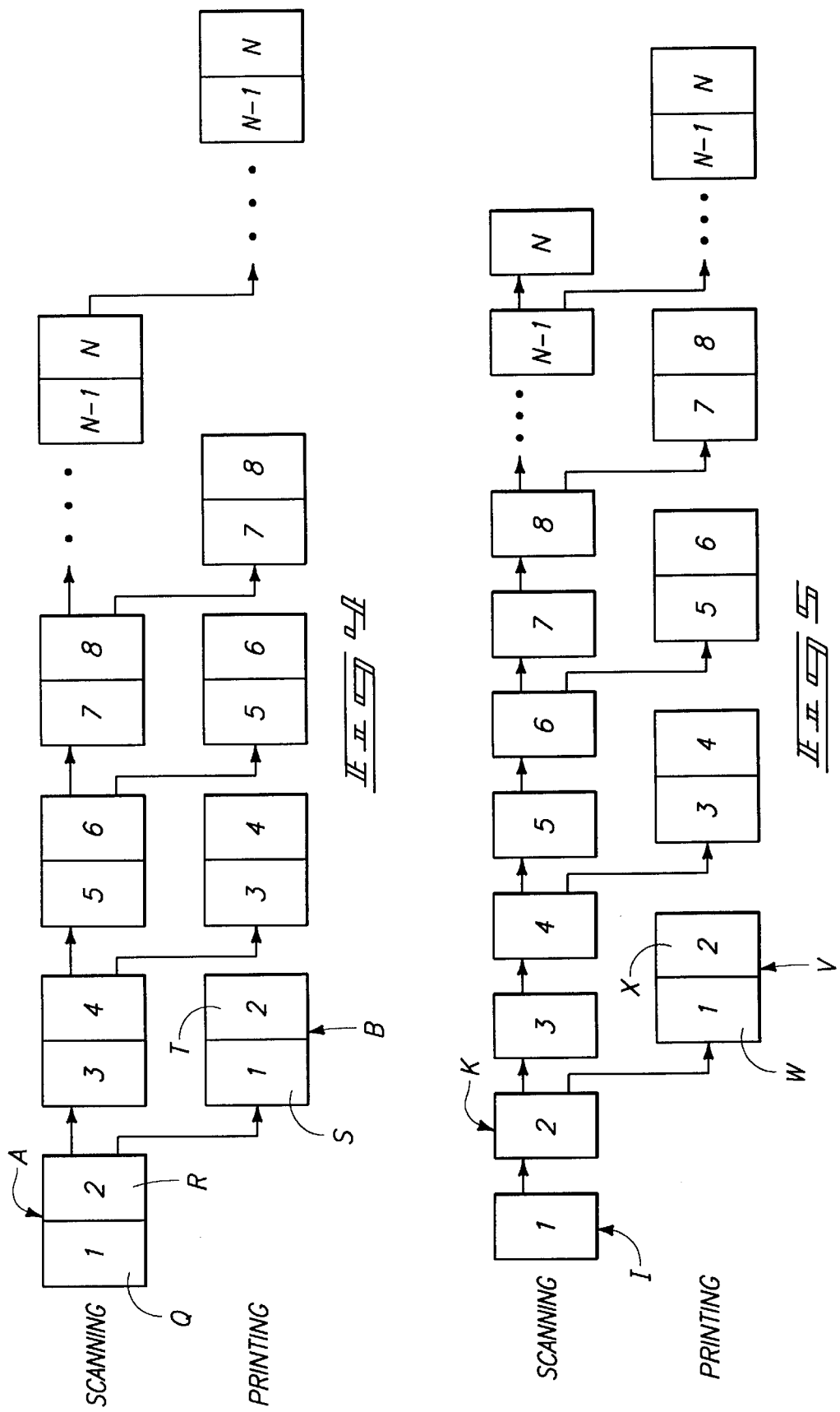

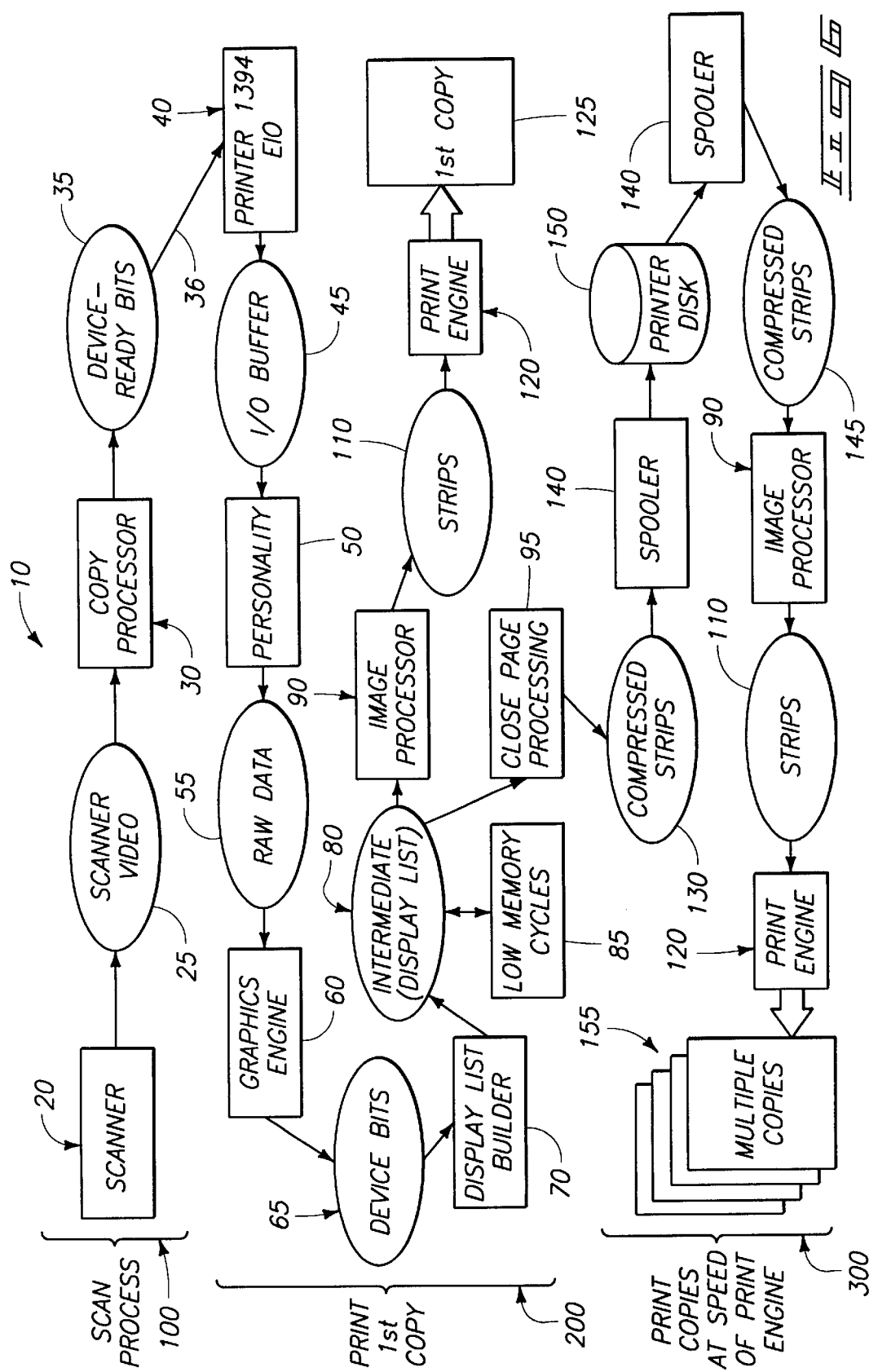

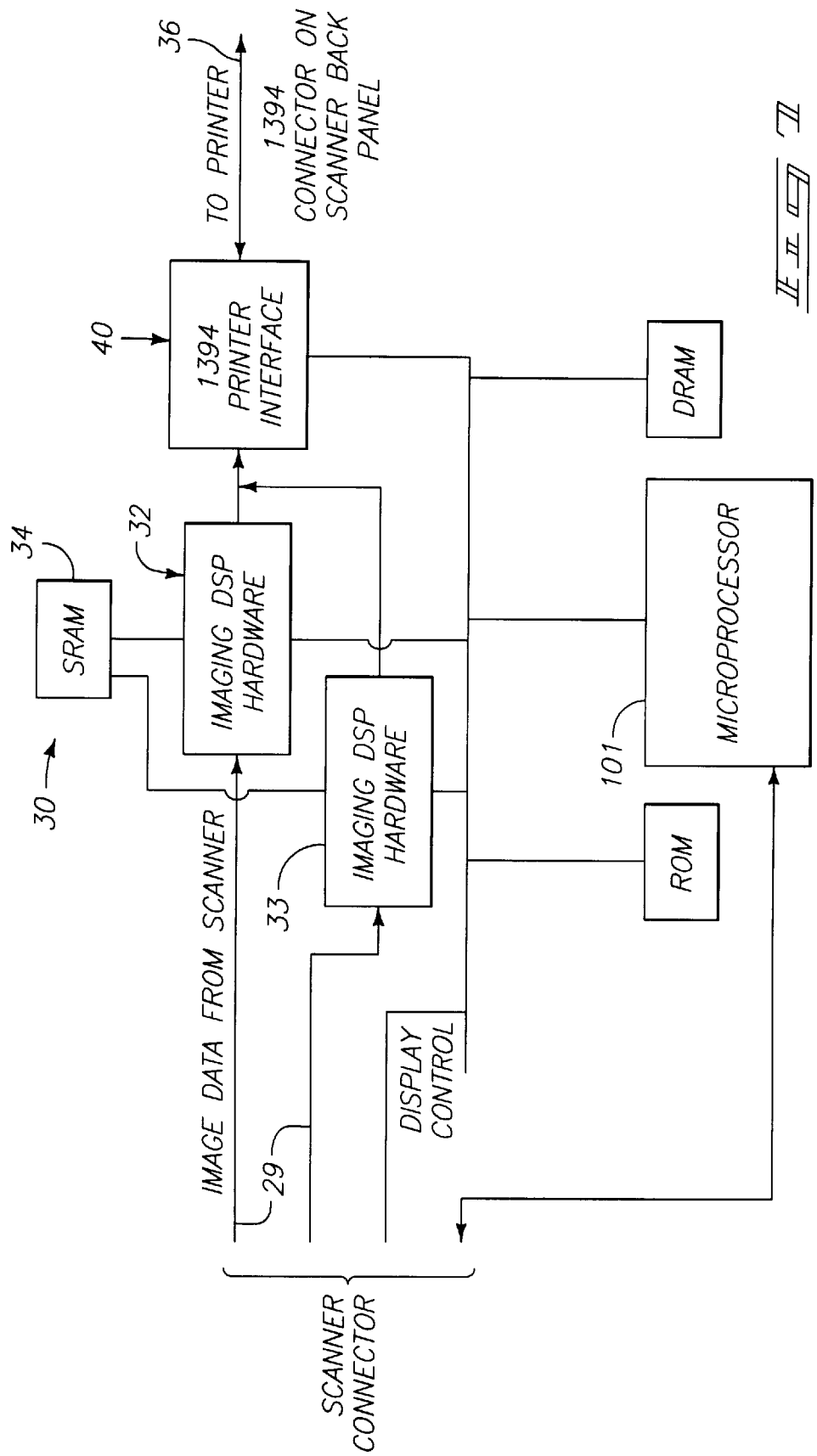

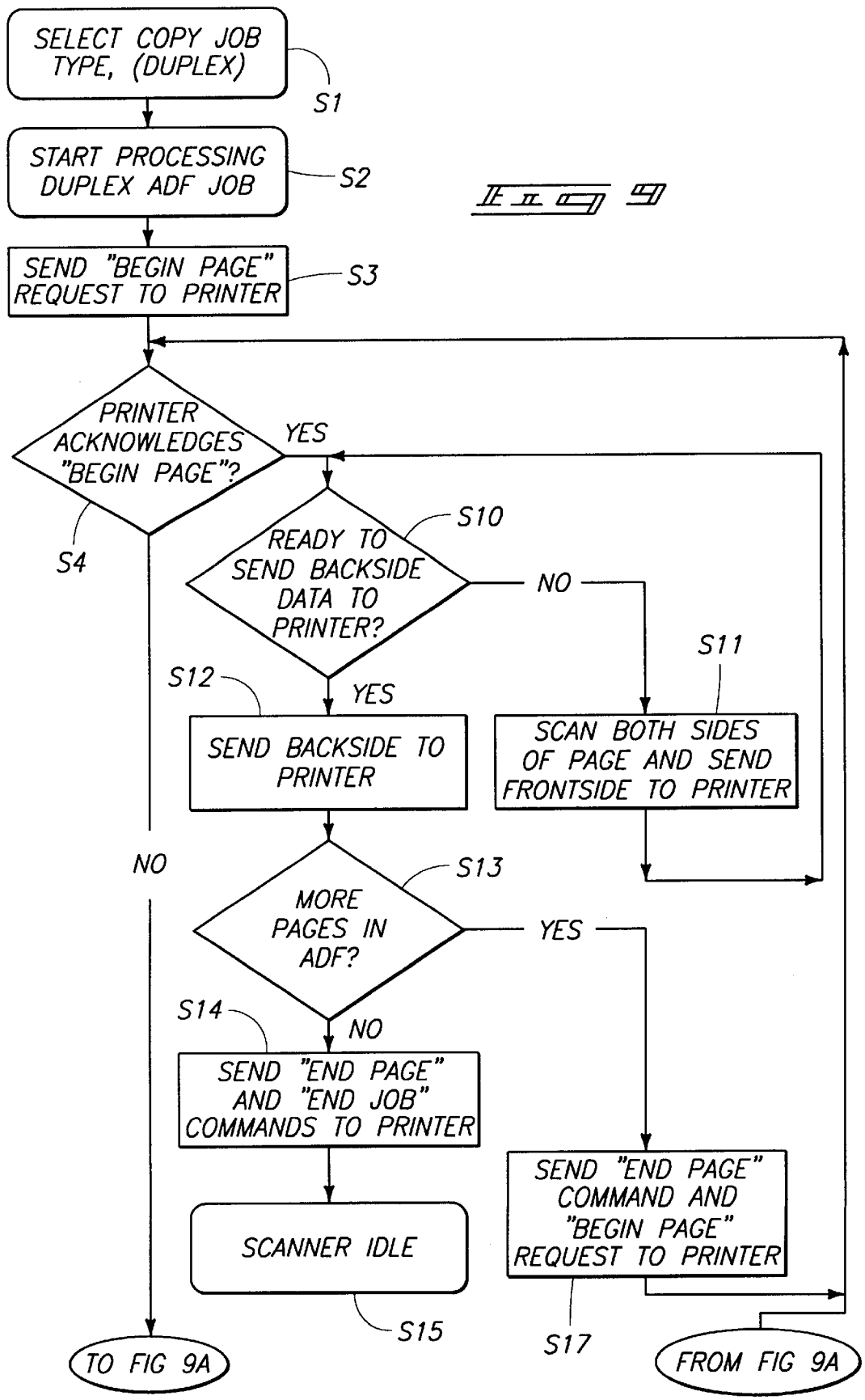

IMAGE COPIER HAVING ENHANCED DUPLEX CAPABILITIES; METHOD OF PRINTING A COPY OF A DOCUMENT TO PRODUCE A DUPLEX COPY PRODUCT

FIELD OF THE INVENTION

This invention pertains to image copiers and, more particularly, to a multi-purpose copier/printer having duplex printing capability.

BACKGROUND OF THE INVENTION

Traditionally, office environments have been provided with photocopiers for making exact imagery productions of documents, printers for printing documents from computers, and facsimile machines for sending and receiving facsimiles. With the advent of digital office equipment, it has been recognized that each of these pieces of office equipment merely handles a digital file. Therefore, recent efforts have been made to combine two or more of these office machines into a single machine. Such a machine has been termed a "mopier" by one manufacturer. The distinguishing characteristics of these machines are that they are provided with a digital printer which is configured to receive a digital print file and print the file onto a sheet of printable medium such as paper. Information to be printed can be, for example, a digital file sent directly from a personal computer to the printer, a document which is scanned and digitized and then sent in a digital form to the printer, or a file which can be received over a telephone line in analog or digital form, converted into a digital form, if necessary, and then printed, such as is done for facsimiles.

Users frequently desire to print documents in a duplex format. Duplex copying includes reproducing an original document which has matter printed on both sides of a single page so that the final product appears in a nearly identical format as the original product. Duplex copying also includes reproducing a single side from two sheets of a document onto both sides of a single sheet in the final product. The first example of duplex copying is known as 2→2 copying, since a dual-sided original is reproduced as a dual-sided copy. The second example of duplex copying is known as 1→2 copying, since single-sided originals are reproduced as double-sided copy products.

Modern printers and copiers are frequently provided with a laser copying element. In order to handle the rather large digital files which are required to faithfully reproduce an original file, substantial computer readable memory is typically also provided with the printer, In traditional duplex copying, an original multiple page document is deposited face up in a document feeder. This means that the last page of the document will be the first page processed by the document feeder. This configuration is not only traditional in digital copiers, but in analog copiers as well. Thus, in the prior art, when a user selected duplex copying, all pages of the document were first scanned, and the scanned images saved in a computer readable memory. After scanning the full document, a processor within the copier electronically assembled the pages for duplex reproduction. Copying then began by printing the first page of the document, the second page of the document, etc. In analog copiers, for a multi-copy print job, the original image is typically scanned as many times as there are number of copies to be made. Also, analog copiers typically require pages to be accumulated in an internal holding bin so that all front sides are first printed and accumulated, and then the backsides are printed. Thus, the first sheet of copy product will not be produced until at least all front sides are scanned and printed. This significantly reduces the time-to-first-copy of the copy product. While some electrostatic copiers may have provided for first page scanning followed by first page printing prior to scanning the entire document, no copier in which the image is first saved as an electronic data file provided such a feature. This significantly reduces the time between the moment a document is submitted for scanning and the first page is printed. However, for a variety of reasons, it is desirable that the time between the scanning of the first sheet of a document and the printing of the first page of the copy be minimized.

FIG. 1 shows a diagram of the prior art method of 2→2 duplex copying showing how both sides of a first sheet C are first scanned, both sides of a second sheet B are first scanned, and so on, until all sides of the document are scanned. In the traditional "face up" original receiving tray of the scanner, the last page of the document is scanned first, on through the first page being scanned last, as indicated in FIG. 1. In FIG. 1, sides N–1 and N represent the two sides of the last sheet C of the document. Thereafter, the first page of the document M is printed, second page P, and so on until the final page L is printed. In like manner, FIG. 2 shows a diagram of the prior art method of printing a 1→2 duplex copy. The sheets of the original document are all first scanned in a single-side, face-up scan mode, beginning with the last sheet C and continuing on through sheet A. Thereafter, the duplex copies are printed, beginning with the two first sides of the two first sheets of the original document being printed on sides one and two of the first sheet M of the copy product, and so on until the first sides of the penultimate sheet D and last sheet C of the original document are printed on the two sides of the last sheet L of the copy product.

In electrostatic or photostatic copy devices, the sheets in the printing of the copy product are typically handled one page at a time. Contrariwise, multipurpose copiers are configured to first receive the entire document as an electronic data file and store the document onto a computer readable memory such as a hard disk or RAM. Thereafter, the copies are printed in accordance with user instructions for a selected copy product. For example, the multi-purpose copier may be connected to a personal computer. The user may request that five copies of a document from the user's computer be printed by the copier/printer. In a traditional printer configuration, the user's computer would send five separate copy requests to the printer. With the multi-purpose copier/printer, a single print request for five copies is sent to the printer. The electronic file is stored on a memory device such as a hard drive. Five copies of the document are then printed from the internal memory of the copier/printer. It is because of this architecture that duplex copies are traditionally printed after all sheets have been scanned by the scanner, as opposed to the traditional method of printing duplex copies from an electrostatic copier.

Since the multi-purpose copier/printer (mopier) is configured to receive documents from several sources, including an original hard copy document scanner, it is not configured to provide first page scanning followed by first page printing. It is, therefore, desirable to provide a multi-purpose copier/printer having the capability to scan and, subsequently, print a first page of a document prior to scanning all subsequent pages of the original document and, more particularly, to provide this feature in a duplex mode.

SUMMARY OF THE INVENTION

In a first aspect of the invention, an image copier comprises a scanner configured to electronically scan a first page side, a second page side, and a third page side of an original document comprising at least two pages. The scanner is further configured to produce an electronic data stream comprising discrete electronic representations of the individual page sides of the document. The image copier has a printer configured to print the discrete electronic representations of the first and second page sides of the document as a duplex page of copy product prior to completing the scanning of the third page side of the document.

More specifically, in one embodiment the scanner produces an electronic data stream comprising discrete electronic representations discretized according to the page side scanned. The copier can further include a computer readable memory. The image can also have a copy processor configured to receive user inputs which define a copy product to be produced by the copier from the electronic data stream which is provided by the scanner. The copy processor can be configured to receive the discrete electronic representations of the page sides of the document and build discrete digital representations of the page sides therefrom. These digital representations of the page sides can be stored in the computer readable memory. The image copier can further comprise an image processor configured to receive the digital representations of the page sides of the document from the computer readable memory and arrange these digital representations into a print-engine readable data set which represents the page sides of the document.

In another embodiment the image copier has a print engine configured to receive the print-engine readable data set of the page sides of the document and convert the print-engine readable data set into a set of electronic signals which are usable by a print element to print a final copy product. The image copier includes the print element, which is configured to receive such signals and produce a copy product containing images of page sides of the document in response to a command from the copy processor, which includes a designation of the copy product as selected by the user. The image processor in the copier is preferably further configured to receive the digital representations of the page sides of the original document from the computer readable memory as soon as the print engine is ready to receive the print-engine readable data set, thus providing for first-in/first-out document scanning and printing.

A second aspect of the invention is a method of duplex copying a plurality of sheets respectively having first and second sides defining page sides. The method includes the steps of scanning a first page side of one of the sheets to produce a first electronic image, scanning a second page side of one of the sheets to produce a second electronic image, and scanning a third page side of one of the sheets to produce a third electronic image. The method includes the step of commencing printing of a copy of the first electronic image of the first page side prior to scanning the third page side of one of the sheets.

In one embodiment of the second aspect of the invention, the document has at least three page sides (that is, at least two pages each having two page sides of interest). The method produces a copy product in which two page sides of the original document are printed on a single sheet of printable medium in the copy product, as selected by a user. The embodiment of method includes the step of providing a document scanner, a print buffer, and a print element. The method further includes the step of scanning a first page side of the document with the scanner to produce a first electronic data stream comprising discrete electronic representations of the first page side of the document. Thereafter, a second page side of the document is scanned to produce a second electronic data stream comprising discrete electronic representations of the second page side of the document. The electronic representations of the first and second page sides of the document are provided to a print buffer, which comprises a computer readable memory. From the print buffer, the discrete electronic representations of the first and second page sides of the document are sent to a print element. The method then includes the step of printing the discrete electronic representations of the first and second page sides of the document on a single sheet of printable medium such that the first page side of the document appears on the first side of a sheet of printable medium, and the second page side of the document appears on the second side of the sheet of printable medium. Alternately, the first page side of the original document can be stored in memory and then printed, after which the second page side is stored in memory and then printed.

Other features and advantages of the invention will become apparent to those of ordinary skill in the art upon review of the following detailed description, claims, and drawings.

DESCRIPTION OF THE DRAWINGS

FIG. 1 depicts the prior art manner of 2→2 duplex copying.

FIG. 2 depicts the prior art manner of 1→2 duplex copying.

FIG. 4 depicts a diagram of the method of 2→2 duplex copying in accordance with the present invention.

FIG. 5 depicts a method of 1→2 duplex copying in accordance with the present invention.

FIG. 6 depicts a block diagram of an image copier and the various components which comprise one embodiment of the present invention.

FIG. 7 depicts a block diagram of components of a copy processor which can be used in one embodiment of the present invention.

FIG. 9 and FIG. 9A depict a flow chart of computer executable steps for performing duplex copying in accordance with one embodiment of the present invention.

DETAILED DESCRIPTION OF EMBODIMENTS OF THE PRESENT INVENTION

The protection sought is not to be limited to the disclosed embodiments, which are given by way of example only, but instead is to be limited only by the scope of the appended claims.

The present invention describes a method and apparatus for enhanced duplex printing of a document to allow a first duplex copy of two page sides of the original document to be printed prior to or concurrent with the scanning of subsequent page sides of the original document, in order to produce a copy product in a reduced first-copy-out manner. One aspect of the invention includes an image copier which is configured to produce a duplex copy of the first page of an original document, the copier having a scanner and a printer configured to scan the two first page sides of interest of the document and produce a data stream representing two page sides of the original document, and a printer configured to print the first two page sides of an original document on a single sheet. That is, the printer includes a "duplexer", being a known apparatus for printing duplex (or double-sided) copies. The copier further includes an image processing pipe-line for configuring the data stream which represents the two page sides of the original document and presents them for printing by the printer prior to or concurrent with the subsequent scanning of additional page sides of the original document. A second aspect of the current invention includes a method of scanning a first and second page side of an original document, printing the first and second page sides as the first page of a copy product, and subsequently or concurrently scanning subsequent page sides of the original document. When a page side is referred to herein as being either a first page side or a second page side, it is understood that there is no necessary relationship with either a front side or a back side of a page of the original document or the copy product.

APPARATUS IN ACCORDANCE WITH THE PRESENT INVENTION

Figure 3:
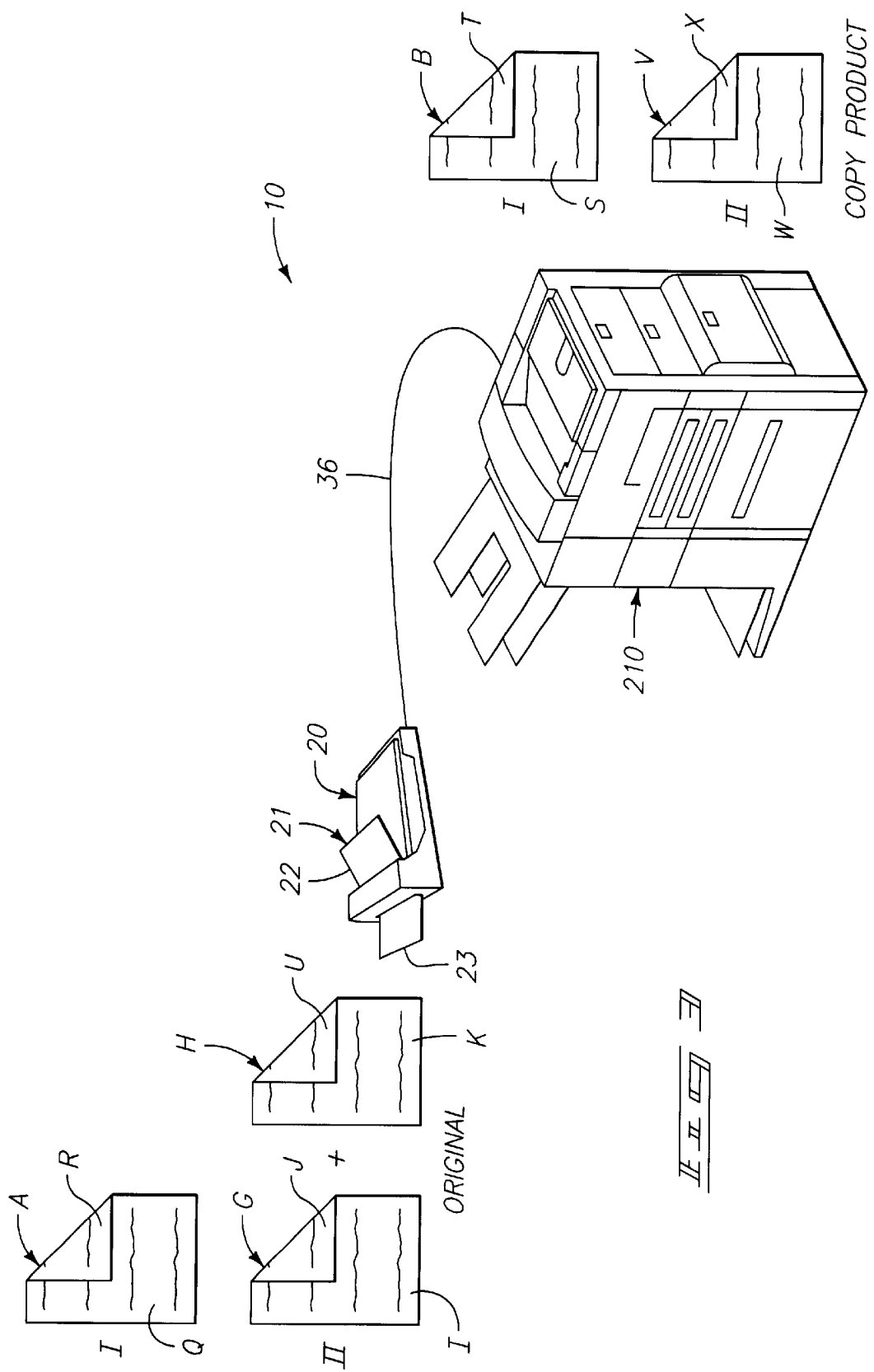
FIG. 3 depicts a copier which can operate in accordance with the present invention.
Figure 8:
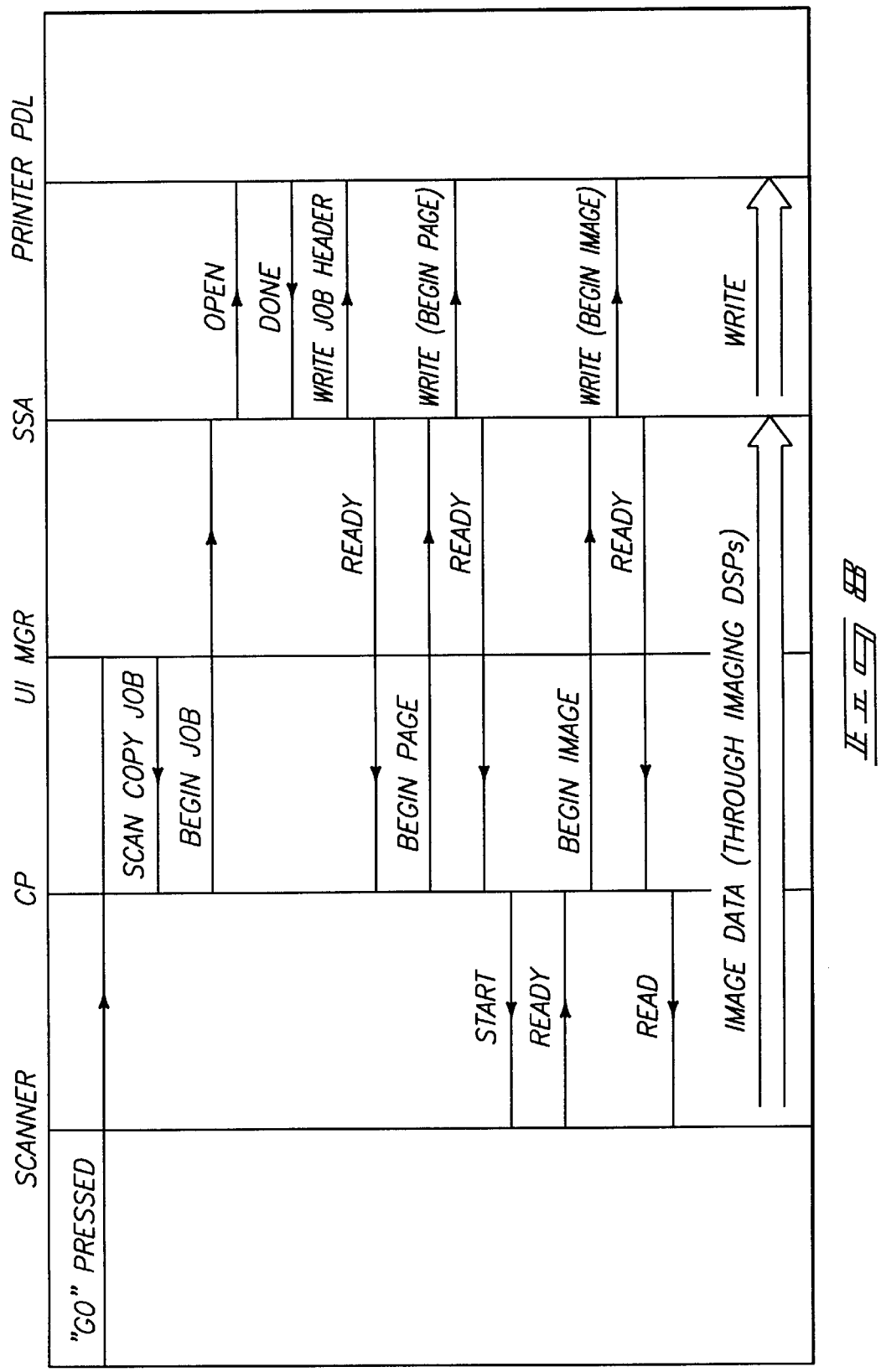
FIG. 8 depicts a communication diagram depicting a communication protocol between a scanner and a printer in accordance with one embodiment of the present invention.

Turning to FIG. 3, an apparatus for performing duplex copying in accordance with one embodiment of the present invention is shown. In FIG. 3, an image copier 10, which is configured to produce duplex copies in accordance with the present invention, is shown. The primary components of the image copier 10 comprise the scanner 20 and the printer 210, which are connected by interface connection 36.

The scanner is preferably a electronic optical scanner which comprises an automatic document feeder (ADF) 21 which is more preferably a face-down ADF. That is, the original document should be presented to the document feeder 21 in a manner such that the first page is received within the receiving tray 22 in a manner such that the first page of the document is the first page scanned by the scanner 20. Traditionally, this would require that the document be placed in a face-down position in the document feeder 21. That is, in a document consisting of pages 1 through N, page 1 would be placed face-down in the receiving tray 22. In such a configuration, the scanner 20 traditionally feeds documents from the bottom of the document feeder tray 22. However, in a document feeder configured to feed the top page from the top of a stack of sheets, it is understood that the document is placed in a face-up presentation in the receiving tray 22. That is, the document feeder 20 is configured such that the first page of the document is the first page fed into the scanner. More preferably, the scanner 20 comprises a dual-side scanner which is configured to scan both sides of a page of the document during a single pass of the page of the document through the scanner.

After scanning a first page of the document, the page is deposited in the output tray 23 and the automatic document feeder 21 proceeds to receive and scan the second page of the document. Ag each page of the document is scanned, the optical image is converted into an electronic data stream comprising discrete electronic representations of the page side of the document being scanned. In the case of a dual-scan scanner, two parallel data streams are produced and are processed simultaneously or in succession. The data streams are electronically processed and are sent to the printer 210 through communication link 36.

As indicated in FIG. 3-I, in the 2→2 duplex copy mode, an original document page A having printed first side Q and printed second side R is scanned by the scanner 20, electronically processed, and sent to the printer 210 which prints a copy product B having a printed first side S and a printed second side T. Such is further shown in FIG. 4. In 1→2 duplex copying, as indicated in FIG. 3-II, two original pages G and H of the original document are scanned by the scanner 20. First page G has a printed first side I and a second blank side J. Second page of the original document H has a printed first side K and a blank second side U. A copy product in 1→2 copying of original pages G and H is the copy product page V having a printed first side W and a printed second side X. Such is further shown in FIG. 5.

Turning to FIG. 6, the primary components of copier 10 are the scan process 100 and the print processes 200 and 300. The scan process include scanner 20 which produces a scanned video image which comprises the electronic data stream comprising discrete electronic representations of the page sides of the document. The discrete electronic representations of the page sides are received by the copy processor 30 which electronically processes the data streams to put them in a better condition for subsequent processing by the print processes 200 and 300 using the printer 210.

Turning to FIG. 7, a detailed block diagram of the copy processor 30 is shown. The diagram in FIG. 7 shows a dual-scan copier having two data processors 32 and 33 which individually process the current page side of the document being scanned. The images are temporarily stored in the static random access memory 34. A microprocessor 101 in configured to receive the discrete electronic representations of the page sides and build discrete digital electronic representations of the page sides therefrom. Such includes steps such as filtering the discrete electronic representations to remove extraneous noise, and other filtering and labeling steps which put the data in a position for ease of future processing. When data is provided to the copy processor in an unconstrained form, it can be pre-rendered as a final copy product to save subsequent processing steps. Following the processing of the electronic data streams by the microprocessor 101, the resulting discrete digital representations are sent directly to the printer 210 via the printer electronic input/output card 40 of FIG. 6 by way of communication link 36. In this state, the digital representations represent the device-ready bits 35 of FIG. 6.

Returning to FIG. 6, the processed discrete digital representations received from the scanner 20 are initially stored in an input/output buffer 45 which comprises a computer readable memory. The discrete digital representations can then be processed in the personality processor 50. Personality processor 50 receives a page description of the desired copy product as dictated by the user. For example, personality traits identified in personality processor 50 include page size, magnification, whether the copy is to be single-sided or dual-sided, and other attributes which affect the appearance of the final copy product. The resulting raw data 55 is then provided to a graphics engine 60 which configures the digital representations into a digital graphics file which is indicated as device bits 65. Graphics files are further compiled in the display list builder 70 which provides a digital file of each page side to the intermediate display list 80. Display list 80 comprises a computer readable memory configured to store a relatively large number of graphics files of page sizes. The image processing pipeline is preferably configured such that the speed of data flow from scanner 20 to intermediate display list 80 preferably does not limit the speed at which sheets are scanned, but instead the scanner is able to operate at its design speed. That is, the speed of the data flow from scanner 20 to intermediate list 80 is preferably dictated by the speed at which the scanner 20 can scan pages of the original document, rather than by the rate at which data can be processed by the image processing pipeline. As indicated in FIG. 6, data flow from the display list 80 to the print engine 120 is through the image processor 90. The speed at which data can be removed from the display list 80 and printed by the print engine 120 is dictated by both the capacity of the image processor and the speed at which copy product can be produced by the print engine 120 and the print element (not shown).

Although the diagram of FIG. 6 suggests that there are several distinct computer readable memories such as device-ready bits 35, input/output buffer 45, raw data 55, device bits 65, intermediate display list 80, and strips (input/output buffer) 110, in fact, all such computer readable data memory can comprise a single mass computer readable memory device such as a RAM, DRAM, SRAM, or other type of memory device. In like manner, FIG. 6 suggests that there is an individual copy processor, graphics engine, image processor, and print engine. In fact, the different data processing steps can be performed by a single microprocessor. In like manner, processing steps can be performed by individual sub-routines or sub-programs which can be accessed from a computer readable memory by a single computer processor. In one embodiment, the various processing steps are stored in a read-only memory (ROM) and are accessed by the microprocessor at the appropriate time during the process of scanning, imaging, and printing the image. The various processors and processing steps described herein can be performed by dedicated microprocessors, hardware, software, firmware, or other means known in the art.

The image processor 90 is configured to receive the digital representations of the page sides of the documents (as modified, if necessary, by graphics engine 60) from the display list 80 and arrange the digital representations into a print-engine readable data set which represents the page sides of the document. The print-engine readable data sets are compiled in the strips print buffer 110 to compile a page side of printable subject matter. Once a complete page side has been assembled in the print buffer 110, the print engine receives the page side file and prints a page 125 of the copy product. In the case of duplex copying, two page sides of print-engine readable data can be accumulated in the print buffer 110 prior to being received by the print engine 120 and printed into a single page of copy product. Alternately, where buffer 100 is limited in capacity, individual page sides can be compressed using a data compression routine, and stored on the printer disc 150 until there is sufficient capacity in the memory 80 to receive them.

Thus, in one embodiment, the apparatus 10 comprises a source (here, the scanner 20) that generates raster image data at data rates which, preferably, are comparable to the printer engine speed. Raster data comprises a bit-stream of data according to a second page width. In FIG. 6, the scanner 20 and the copy processor 30 generally comprise the source. The image copier 10 further comprises a printer 210 (FIG. 3) that processes the raster image data from the source 100, as well as an input/output connection 36 between the source and the printer processes (200 and 300) that can sustain the data rate generated by the source.

The printer functions 200 and 300 of FIG. 6 (and 210 of FIG.3) comprise an input/output subsystem 40 that receives the raster data form the source 100, an image processing pipeline that converts the raster data to an engine ready format, and a print engine 120 that places the converted data on output pages 125. The image processing pipeline comprises data processing routines configured to process the image data from the scanner to print-engine readable data or data which is easily converted to print-engine readable data. In the embodiment shown, the image processing pipeline includes the input/output buffer 45 and processing routines which include the personality 50, the graphics engine 60, the display list builder 70, and the image processor 90. The image processing pipeline further comprises computer readable memory for storing raw data 55 from the personality routine, device bits 65 from the graphics engine 60, and the intermediate display list 80 for receiving the digital representations of the page side prior to being processed by the image processor 90 into print-engine readable data and stored in the input/output buffer (strips) 110. The computer readable memory can comprise either a single memory device or a plurality of different memory devices such as RAM, DRAM, SRAM, ROM, and other known devices and methods for storing computer readable data.

When the raster data from the source 100 is constrained (that is, scaled and clipped according to the selected copy product), it is then in a condition to be stored on the display list 80. However, if the raster data is unconstrained, it is preferably pre-processed prior to being placed on the display list 80. Such processing can be performed by the graphics engine 60 and the display list builder 70, to convert the unconstrained raster data from the source 100 into constrained raster data by appropriate scaling, clipping and other digital file processing necessary to fit the image data onto the selected output copy product. The attributes of the constraints are preferably retained in the personality subsystem 50. These constraints are communicated to the graphics engine 60 and the display list builder 70 in order to allow them to perform functions to constrain the unconstrained raster data.

In one embodiment of the invention, the input/output buffer 45 is stored on the display list 80 to minimize copying of data from a separate input/output data buffer to the display list. Alternately, the data on the input/output buffer 45 can be compressed into a new input/output buffer before it is placed on the display list, to allow the input/output buffer 45 to be returned to accept data when the compression is completed. This frees the input/output buffer to receive data rather than waiting for data to be moved from the input/output buffer 45 through the image processing pipeline to the display list 80.

Image data is preferably displayed on the display list 80 until the print engine 120 is ready to print the image on output medium 125. When the medium (such as paper) 125 is in position, the image processor task 90 processes the image data for the page from the display list 80. In one embodiment, the image processor 90 copies or decompresses the image data directly to strip buffers 110. Each strip buffer is configured to preferably hold raster data the width of a page and, typically, 100 to 200 rows high (rows of pixels). Three strip buffers are typically sufficient to store sufficient engine ready data to allow the print engine to print approximately 5 cm of one page of a single sheet of output paper. Thus, during printing of a page side, data flows from the display list 80 to the image processor 90 where it is configured to print-engine readable data, and from there to the strips buffer 110, and then to the print engine 120 which converts it into signals received by the print element for printing on the sheet of medium.

The image copier of the present invention can also comprise a module for printing multiple copies of a duplex document. Turning to FIG. 6, a "print copies at speed of print engine" module 300 can be incorporated into the image copier of the present invention as shown. Such module is used where multiple copies of an original document are to be printed. In such a configuration, the complete original document is first scanned and stored into a memory which can comprise the printer disk 150 which can comprise a hard disk memory storage device. In such configuration, the page sides of the original document are first assembled on the intermediate display list 80 and are then processed through the closed page processing routine 95, where the data from the display list is compressed into strips at process 130 and then provided to spooler 140 where the compressed data is assembled into a sequence according to the original document and the desired copy product. Data from the spooler is then preferably stored on the printer disk 150. Once the entire original document has been stored onto the printer disk 150 through the process just described, the spooler 140 begins the sequence of printing by decompressing sequential pages through the compressed strips processor 145, which decompresses the compressed image data. The image processor 90 then receives the decompressed image data from the compressed strips module 145 and sends it to the printer buffer 110 where the document is printed via the print engine 120 in the manner described above for single copy duplex copying. The speed at which multiple copies can be produced is thus preferably limited by the speed of the print engine and the print element, rather than by a need to accumulate all page sides prior to printing, as in the prior art.

Turning to FIG. 9, a diagram of the communication link between the data source (copy processor, or CP) and the printer (scanner server agent, or SSA, and printer data language, or PDL) is shown. The communication configuration of FIG. 9 is a client/server configuration in which the source, or the scanner, is the client, and the printer is the server. Such configuration can also be known as a "push" configuration. The communication technique can also be configured such that the printer requests information from the source rather than having the source sending commands to the printer, known as a "pull" configuration.

In FIG. 9, in a first step, a user presses a "go" button to begin scanning a document for duplication or copying. The user interface manager (UI MGR) returns a "scan copy job" command to the copy processor which then sends a "begin job" command to the SSA. Essentially, this configures the printer to acknowledge that a print job will be directed to the printer and allows the printer to configure its data path to accept data for a new print job. This is performed in the "write job header" command. In response to this command, the copy processor sends the page attributes to the SSA in the "begin page" message. The SSA determines the constraint values by polling the printer system, that is, the printer data language (PDL), and returns the constraint values to the copy processor in the first "ready" reply. The copy processor uses the information regarding the constraint values to determine the size and alignment of the image data it will send to the printer. The copy processor sends the size and alignment attributes in the "begin image" message so the printer will know whether to expect constrained raster data or unconstrained raster data, as discussed previously. After the printer sends the second "ready" reply, the copy processor sends the constrained raster data and the printer processes the raster data as described above.

Figure 9A:
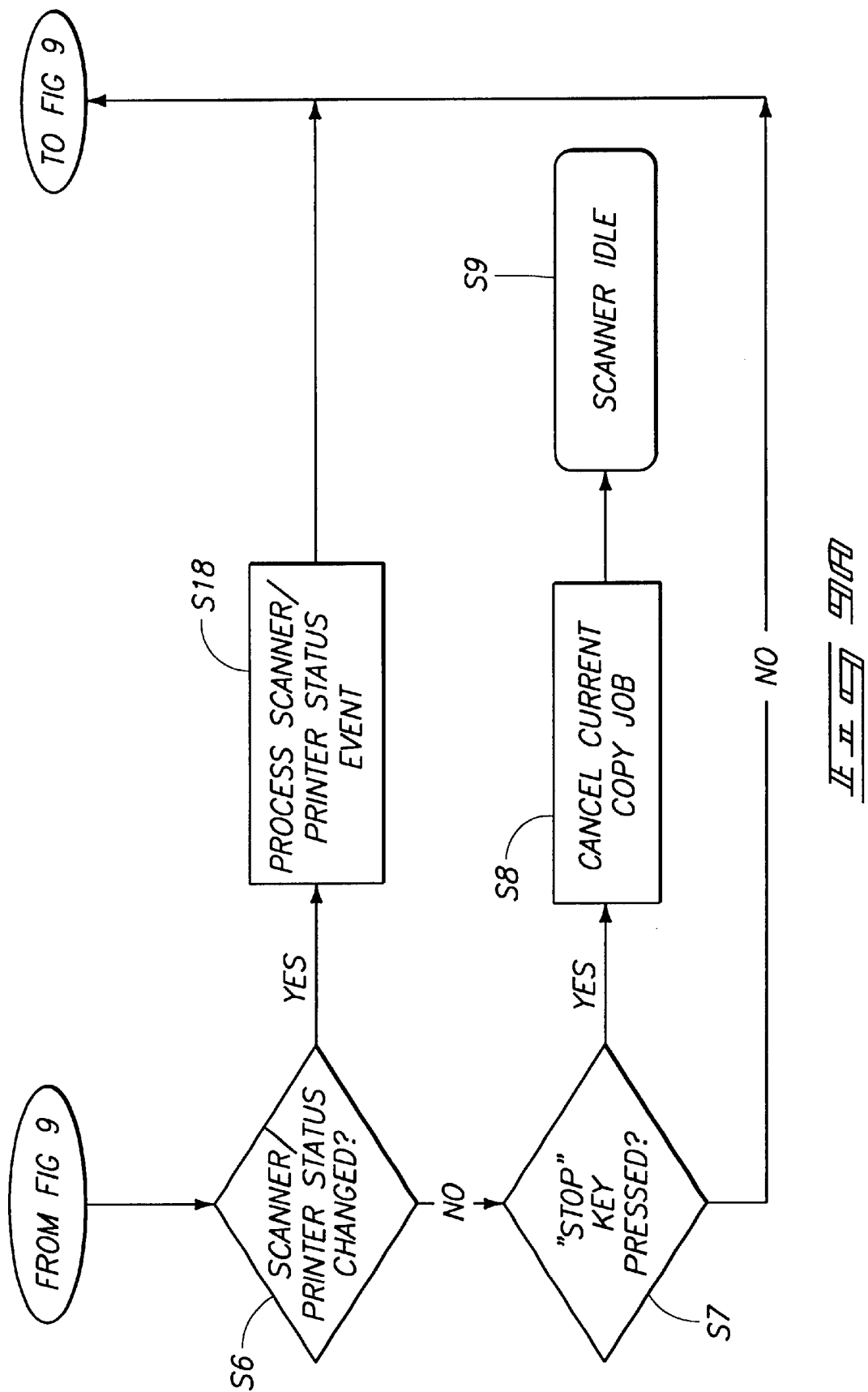

Turning to FIGS. 9 and 9A, a logic flow diagram shows how the copy imager of the present invention can be configured in its operational logic to allow the first page of a duplex copy to be printed prior to scanning and accumulating the information from the subsequent pages of the original document. In the flow chart, at step S1, a user selects a copy job type. In this case a duplex copy is selected. If another type of copy job is selected, such as simplex, then an alternate flow diagram is used. In step S2, the copy processor configures an instruction regarding the copy-job type and sends this information to the printer with the "begin page" request in step S3. The printer acknowledges the "begin page" request from the copy processor in step S4. However, if the printer does not acknowledge the "begin page" request from the copy processor, the copy processor checks to determine whether the printer status or the scanner status has changed in step S6. If there has been no change in the status of the scanner or the printer, then, in step 57, the copy processor checks to determine whether the "stop" key on the scanner or the copier has been pressed. If yes, then the copy processor cancels the current job at step S8 and the scanner becomes idle at step S9. If the scanner or printer status has changed, then the event causing the status change is processed at step S18 and the copy processor once again checks to determine whether the printer acknowledges the "begin page" request at step S4.

If the printer does acknowledge the "begin page" request at step S4, then the program logic proceeds to step S10. As seen in step S11, the scanner is preferably configured to scan both sides of a page of the original document. If the back-side data has not been sent, then the scanner proceeds to scan both sides of the page of the original document and send the front-side page to the printer.

Following the sending of the front-side data to the printer, at step S16, the copy processor checks whether there is more output either to be printed on the same side of a page of the copy product or data to be sent to the back side of the copy product page. If no additional data is to be sent to the printer, then at step S17 the copy processor sends an "end page" command to the printer to indicate the end of the first page of the copy product, followed by a "begin page" request to indicate that a second page of the copy product is forthcoming. However, if there is still data to be sent from the scanner to the printer at step S-17, then the control program returns to the "ready to send back-side data to printer" step at S10. Assuming the first-side data has already been sent to the printer, the program proceeds to step S12 to send the back-side data to the printer. The copy processor then checks at step S13 to determine whether there are more pages in the automatic document feeder (ADF). If not, then the program proceeds to step S14 and sends "end page" and "end job" commands to the printer to indicate the end of the print job. Thereafter, the scanner becomes idle at step S15.

However, if there are additional pages in the automatic document feeder, then the program proceeds to step S16 to determine whether the user has selected a copy product which would require that information from the pages in the document feeder should be printed to the same page of a copy product page currently being configured in the printer. If not, then the program logic proceeds again through step S17 to end the current page of the copy product, and a next page of the document is scanned at step S11.

Note that in a duplex copy job where an automatic document feeder is not used, known as a "flatbed job" because the original document is laid flat on the glass of the scanner, the logic diagram is quite similar to that shown in FIGS. 9 and 9A, except that step S13 is absent and, at step S11, rather than scanning both sides of a page, the two sides of pages presented to the scanning element on the flatbed are scanned. The logic in the copy processor detects that two pages are scanned and separates the data stream comprising the first page from the data stream comprising the second page, to allow a "front side" and a "back side" (relative to the duplex copy product) to be discerned.

In short, in the duplex scanning logic shown in FIGS. 9 and 9A, both sides of each page of an original document are scanned. The front side of the page is sent to the printer first. After the front side is sent, the copy processor sends an "end page" command and a "begin page" request, if necessary, before sending the back side data to the printer. After the back side of the last input page is sent, the copy processor sends the "end page" command to finish the current output page. It will then send the "end job" command to finish the current job.

It is understood that variations on the logic diagram shown in FIGS. 9 and 9A can be made and still accomplish the objectives of the present invention. For example, rather than sending the first side of a page of the original document to the printer and then sending the second side, the copy processor can be configured to send the first side and second side in unison with a label or a tag to indicate the end of the data stream from the first side and the beginning of the data side from the second side.

The logic diagram of FIGS. 9 and 9A configure a duplex copying process such that page sides which are to be reproduced on the copy product are first sent to the printer prior to scanning subsequent page sides of the original document at step S11. This allows a first page of copy product to be produced before all subsequent pages of the original document have been scanned by the scanner. This reduces the time to a "first copy out" aspect of the copy product.

THE METHOD

One aspect of the present invention includes a method of duplex copying of an original document which comprises at least one page, each such page having two page sides, to produce a copy product in which two page sides of the original document are printed on a single sheet of printable medium. This can comprise either the 2→2 copy mode indicated in FIG. 4, or the 1→2 copy mode indicated in FIG. 5. The method includes the step of providing a document scanner, a print buffer, and a print element. The document scanner can include an automatic document feeder and, preferably, includes an automatic document feeder and a scan head having dual scan capability to scan both sides of a page of an original document during a single pass of the page through the scanner. The print buffer comprises computer readable memory and can be any type of computer readable memory such as RAM, ROM, SRAM, DRAM, a hard drive, etc. Preferably, the print element comprises a laser printer.

A next step in the method includes scanning a first side of a first page of the original document with the scanner to produce an electronic data stream comprising discrete electronic representations of the first side of the page of the document. The next step includes scanning a second page side of the original document. This can include scanning either the second side of the first page of the document or the first side of the second page of the original document. In the first instance, if a dual-scan scanner is provided, the first and second sides of the first page of the original document can be scanned essentially simultaneously. In the second instance, where the first side of the first and second pages of the original are scanned, such can be accomplished using either a scanner with an automatic document feeder or a "flatbed", wherein two pages of an original document are placed in a position to be scanned by the scanner, typically on a glass plate which the scanner passes over to scan the document. The scanning of the second page side of the document produces a second electronic data stream comprising discrete electronic representations of a secondary page side of the original document.

Following the scanning of the first and secondary page sides of the original document, the discrete electronic representations thereof are provided to the print buffer. Provided the print buffer is sized sufficiently to store both of the electronic representations, both may be sent at the same time. However, in certain configurations, the print buffer may be sized to only store sufficient data such that only one of the discrete electronic representations of the page side can be provided to the print buffer. When the print buffer is of limited size, preferably the first page side of the page of the original document is provided to the print buffer first.

From the print buffer, the discrete electronic representations of the first page side of the original document and the electronic representations of the second page side of the original document are sent to the print element. Typically, the step of sending the first and second electronic representations to the print element will be performed sequentially. That is, the electronic representations of either the first page side or the second page side will first be sent to the print element, and thereafter the electronic representations of the other page side will be sent to the print.

The method then includes the step of printing the electronic representations of the first page side of the document onto a first side of a sheet of printable medium. Upon receiving the electronic representations of the secondary page side of the original document, they are printed onto a second page side of the sheet of printable medium. Thus, a duplex, or double sided, sheet of printable medium is produced as the copy product, which contains two page sides of an original document. Subsequent to printing the first two page sides of the original document, subsequent page sides are scanned and printed. As indicated, the order in which the first and second page sides are printed is irrelevant.

When the original document comprises more than a single duplex original, or two sheets of single-sided originals, the method includes the additional steps of scanning at least a third page side of the original document and printing the third page side onto a sheet of printable medium of the copy product subsequent to printing the first and second page sides of the original document. This allows a first page of copy product to be printed prior to scanning subsequent pages of the original document, enhancing the time to first-copy of the copy product.

Subsequent page sides of the original document are scanned and are printed following printing of the earlier-scanned page sides. The printing of page sides of the original document is regulated by the speed of the print engine, the computer readable memory made available, the size of the strips buffer 110 of FIG. 6, and the capacity of the copy processor 30 and image processor 90 to process the data streams. That is, printing is not governed by a requirement of scanning more than two page sides of the original document prior to beginning printing.

What is claimed is:

1. An image copier comprising:
    a scanner configured to electronically scan a first page side, a second page side, and a third page side of a document comprising at least two pages, the scanner further configured to produce an electronic data stream comprising discrete electronic representations of the individual page sides of the document; and
    a printer configured to print one of the discrete electronic representations of the first page side or the second page side of the document as a duplex page of copy product while concurrently scanning the third page side of the document.

2. The image copier of claim 1 further comprising a computer readable memory in which each discrete electronic representation of a page side is temporarily stored prior to being printed, and wherein the printer further comprises a print element and a print engine, the print engine configured to read the discrete electronic representation of the page sides from the computer readable memory and send them to the print element for printing on a sheet of printable medium.

3. The image copier of claim 2 further comprising an image processor configured to arrange the discrete electronic representations of the page sides of the document into a print-engine readable data sets and store them into the computer readable memory, and wherein the print engine is configured to read the print-engine readable data sets from the computer readable memory and send them to the print element for printing on the sheet of printable medium.

4. The image copier of claim 3 further comprising a personality routine, and wherein:
    prior to the image processor receiving the discrete electronic representations of the page sides from the computer readable memory, the personality routine is configured to receive the discrete electronic representations of the page sides of the document and to convert the discrete electronic representations to a modified format data set representing the page sides, and to store the modified format data set in the computer readable memory, wherein the modified format data set is constrained to fit on the sheet of printable medium in accordance with the defined copy product.

5. The image copier of claim 3 wherein the image processor is configured to receive the digital representations of the at least two page sides as the modified format data set from the computer readable memory, and to arrange the modified format data set into the print-engine readable data set representing the at least two page sides of the document.

6. The image copier of claim 3 wherein the computer readable memory comprises a first memory component in which the discrete electronic representations of the page sides of the document are stored, and a second memory component comprising a strip buffer in which the print-engine readable data set is stored prior to being received by the print engine.

7. The image copier of claim 2 wherein the print element comprises a laser printer.

8. The image copier of claim 2 further comprising:
   a copy processor configured to receive user inputs defining a copy product to be produced by the copier from the discrete electronic representation of the page sides and to configure the discrete electronic representations of the page sides to match the defined copy product prior to printing thereof; and
   a memory management module configured to detect when the computer readable memory is near capacity and to generate a low memory signal for the copy processor in response thereto, and wherein the copier further comprises a data compression program configured to digitally compress the discrete electronic representations of the pages sides and store them in a secondary computer readable memory in response to receipt of the low memory signal.

9. The image copier of claim 1 further comprising a copy processor configured to receive user inputs defining a copy product to be produced by the copier from the electronic data stream and to configure the discrete electronic representations of the page sides to match the defined copy product prior to printing thereof.

10. The image copier of claim 1 wherein the scanner comprises a document feeder configured to feed a document for scanning in the sequential order of the pages.

11. The image copier of claim 1 wherein the scanner comprises a scanning path through which a page of the document passes to be scanned, and wherein the scanner further comprises a dual-side scanner configured to scan both sides of a page of a document as the pages pass through the scanning path in a single pass.

12. An image copier producing a user selected copy product comprising:
   a scanner configured to electronically scan at least two page sides of a document comprising at least two pages, the scanner further configured to produce an electronic data stream comprising discrete electronic representations of individual page sides of the document;
   a printer comprising an input-output system configured to receive the discrete electronic representations of individual page sides of the document, a printer engine configured to receive engine-ready data, an image processing pipeline configured to convert the discrete electronic representations of individual page sides of the document into engine-ready data, a copy processor configured to electronically process the electronic data stream to put them in condition for subsequent processing, and a print element configured to receive the engine ready data from the printer engine and print a copy of two page sides of the document on a single sheet of printable medium in response to a command from the copy processor; and
   wherein the printer engine is configured to receive the engine-ready data from the processing pipeline in such a manner that the first page of the document scanned is the first page of the copy product printed by the printer, and the last page of the document scanned is the last page of the copy product printed by the printer, and further wherein the image copier is configured to print one of the first two page sides of the document while concurrently scanning a third page side of the document.

13. The image copier of claim 12 wherein the scanner comprises a face-down, automatic document feeding, dual-scan scanner configured to electronically scan both sides of each page of a multi-page document having a first page and a last page, such that the first page of the document is the first page scanned, and the last page of the document is the last page scanned.

14. The image copier of claim 13 wherein the image processing pipeline further comprises a first computer readable memory, and the discrete electronic representations of the individual page sides of the document are stored in the computer readable memory prior to being printed.

15. A method of duplex copying a plurality of sheets respectively having first and second sides defining page sides, the method comprising:
   scanning a first page side of one of the sheets to produce a first electronic image;
   scanning a second page side of one of the sheets to produce a second electronic image; and
   commencing printing of a copy of the first electronic image of one of the first page side or the second page side while scanning a third paqe side of one of the sheets.

16. The method of claim 15 further comprising the steps of storing the first and second electronic images of the first and second page sides in a computer readable memory prior to commencing printing thereof.

17. The method of claim 15 further comprising the steps of printing a copy of the second electronic image of the second page side, and printing a copy of the third electronic image of the third page side.

18. The method of claim 16 further comprising the step of, prior to printing the electronic images of the pages sides, reconfiguring the electronic images to constrain them to fit within constraints of a user defined copy product.

19. The method of claim 15 wherein the electronic images of the page sides are printed using a laser printer.

20. The method of claim 15 wherein the document comprises a plurality of sheets to be copied to pages of a duplex copy product, the first page of the duplex copy product comprising copies made from the first and second electronic images, wherein printing of the first page of the duplex copy product is commenced prior to scanning the last sheets of the document.

* * * * *